United States Patent
Bittman

(10) Patent No.: US 6,173,153 B1
(45) Date of Patent: Jan. 9, 2001

(54) METHOD AND APPARATUS FOR TAKING SCHOOL ATTENDANCE

(76) Inventor: Dean Bittman, 368 Templeside Circle NE, Calgary (CA), T1Y 3L9

( * ) Notice: Under 35 U.S.C. 154(b), the term of this patent shall be extended for 0 days.

(21) Appl. No.: 09/192,107

(22) Filed: Nov. 13, 1998

(51) Int. Cl.[7] ............... E09B 5/00; E09B 19/18; E06F 17/60
(52) U.S. Cl. ............ 434/307 R; 434/308; 434/109; 705/32
(58) Field of Search ............ 434/109, 307 R, 434/308, 319; 705/32

(56) References Cited

U.S. PATENT DOCUMENTS

| | | |
|---|---|---|
| 3,416,243 | 12/1968 | Greenberg . |
| 3,491,464 | 1/1970 | Gray . |
| 4,731,525 | 3/1988 | Hice ........................... 235/472 |
| 4,764,120 | 8/1988 | Griffen et al. ............... 434/336 |
| 4,767,335 | 8/1988 | Curt ............................ 434/352 |
| 5,204,813 | 4/1993 | Samph ........................ 364/419 |
| 5,218,535 | 6/1993 | Pietrowski ................... 364/418 |
| 5,273,437 | 12/1993 | Caldwell et al. ............ 434/351 |
| 5,294,229 | 3/1994 | Hartzell et al. ............. 434/336 |
| 5,496,175 | 3/1996 | Oyama ........................ 434/118 |
| 5,513,994 | 5/1996 | Kershaw et al. ............ 434/350 |
| 5,557,553 | 9/1996 | Sellie .......................... 364/569 |
| 5,956,696 | * 9/1999 | Guryel ........................ 705/32 |

* cited by examiner

Primary Examiner—John Edmund Rovnak
(74) Attorney, Agent, or Firm—David S. Thompson

(57) ABSTRACT

An apparatus for taking school attendance includes a central office computer 101 interfaced with a plurality of attendance telephones 102. Typically, the interface is based on telephone lines or similar hard-wired network. Each AT device may therefore communicate with the central office computer or another AT device by data transmitted through the central office computer. A telephone interface 104 allows the central office computer to outside computers 105, including particularly the school district's central computer and database. The structure and organization of the software associated with the apparatus includes functionality related to the taking, recording and transmitting of school attendance and other purposes.

12 Claims, 14 Drawing Sheets

METHOD AND APPARATUS FOR TAKING SCHOOL ATTENDANCE

CROSS-REFERENCES

There are no applications related to this application filed in this or any foreign country.

BACKGROUND

It is well-known that a substantial amount of a teacher's time in the classroom is spent taking, recording and reporting on student's classroom attendance. While the value of this activity is considerable, in that it promotes attendance, the time spent in transferring lists of student's names between classroom and office is nevertheless burdensome.

The time spent taking attendance is typically multiplied by the fact that students tend to rotate from classroom to classroom as they change subjects; as a result, attendance must be taken each class. Some form of centralized attendance information processing must therefore be employed in which data from each classroom and teacher is combined to result in an attendance profile with respect to each individual student. Typically, if this task is performed, it is done on paper in a very slow and clerical manner.

What is needed is a method and supporting apparatus for taking school attendance which may be adapted for use in schools with a large number of class rooms, laboratories and other area which combines distributed and centralized processing of data to allow teachers to transmit information to, and receive information from, a central office computer.

SUMMARY

The present invention is directed to an apparatus that satisfies the above needs. A novel method and apparatus for taking school attendance is disclosed that combines distributed and centralized processing of data to allow teachers to transmit information to, and receive information from, a central office computer.

The method and apparatus for taking school attendance of the present invention provides:

(A) A central computer and a plurality of AT devices.

(B) Software to enable the attendance telephone to interface with the central office computer for transmission of information to the central office computer.

(C) Software to enable the the central office computer to interface with the attendance telephone (AT device) 104.

(D) Software to enable the attendance telephone to be used to take attendance with interaction with the central office computer.

(E) Software to enable the attendance telephone to be used to take attendance without interaction with the central office computer.

(F) Software to allow a parent to telephone the central office computer and report an excused absence, and for the central office computer to transfer that information to the appropriate attendance telephone.

(G) Software to record voice mail/messages on the attendance telephone.

(H) Software structure required to playback recorded voice mail/messages on the attendance telephone.

(I) Software to record a verbal announcement on the central office computer, and transfer that announcement to an attendance telephone.

(J) Software to allow a teacher using an attendance telephone to access databases resident on the central office computer.

(K) Software required to allow a teacher using an attendance telephone to enter grades or marks associated with each student, and to have that information transferred to the central office computer.

It is therefore a primary advantage of the present invention to provide a novel apparatus and method of use for efficiently taking classroom attendance, creating computer files with that information, and transmitting those files.

Another advantage of the present invention is to provide a novel apparatus and method for producing and relaying audio recordings, typically related to school business, such as class announcements and assignments.

A still further advantage of the present invention is to provide a novel apparatus and method for allowing parents to transmit information to, and receive information from, a central office computer in a secure manner.

DRAWINGS

These and other features, aspects, and advantages of the present invention will become better understood with regard to the following description, appended claims, and accompanying drawings where:

Figure 3:
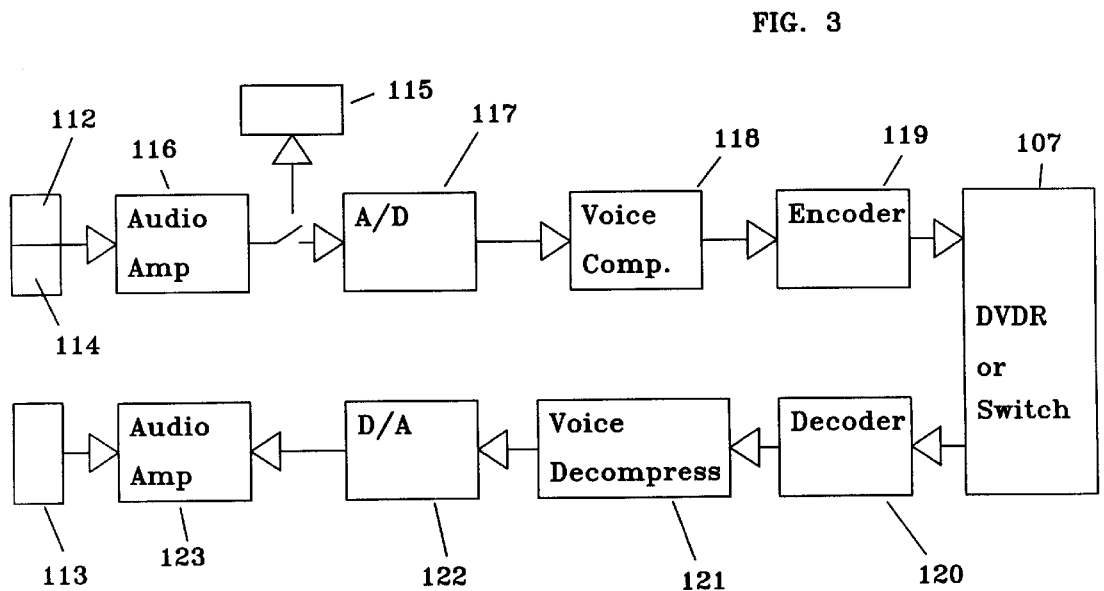
Figure 2:
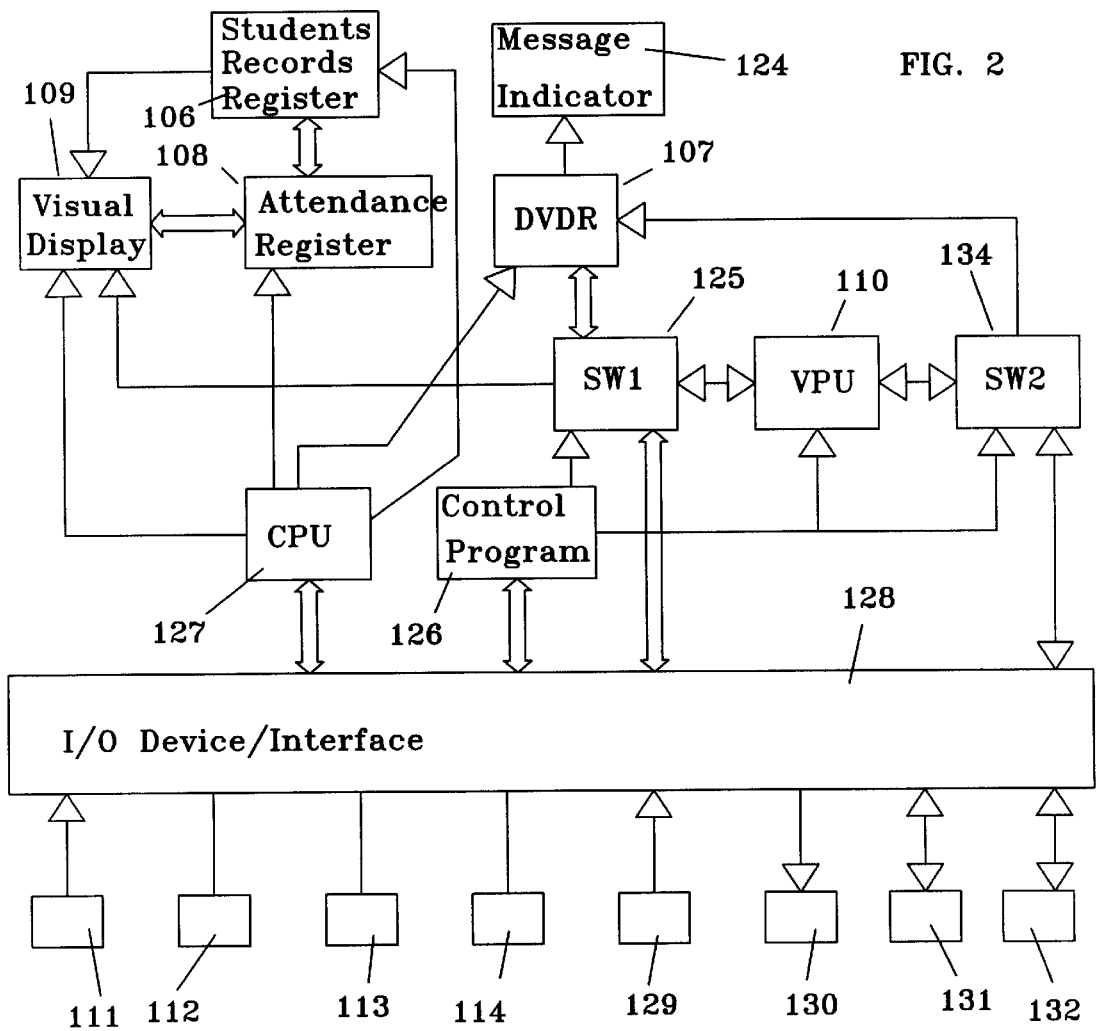
FIG. 2 is a detailed block diagram disclosing the structure of a single attendance telephone device, of a type distributed among classrooms, laboratories and other areas.

FIG. 3. detailed block diagram of the voice processing unit shown in the attendance telephone of FIG. 2.

Figure 4:
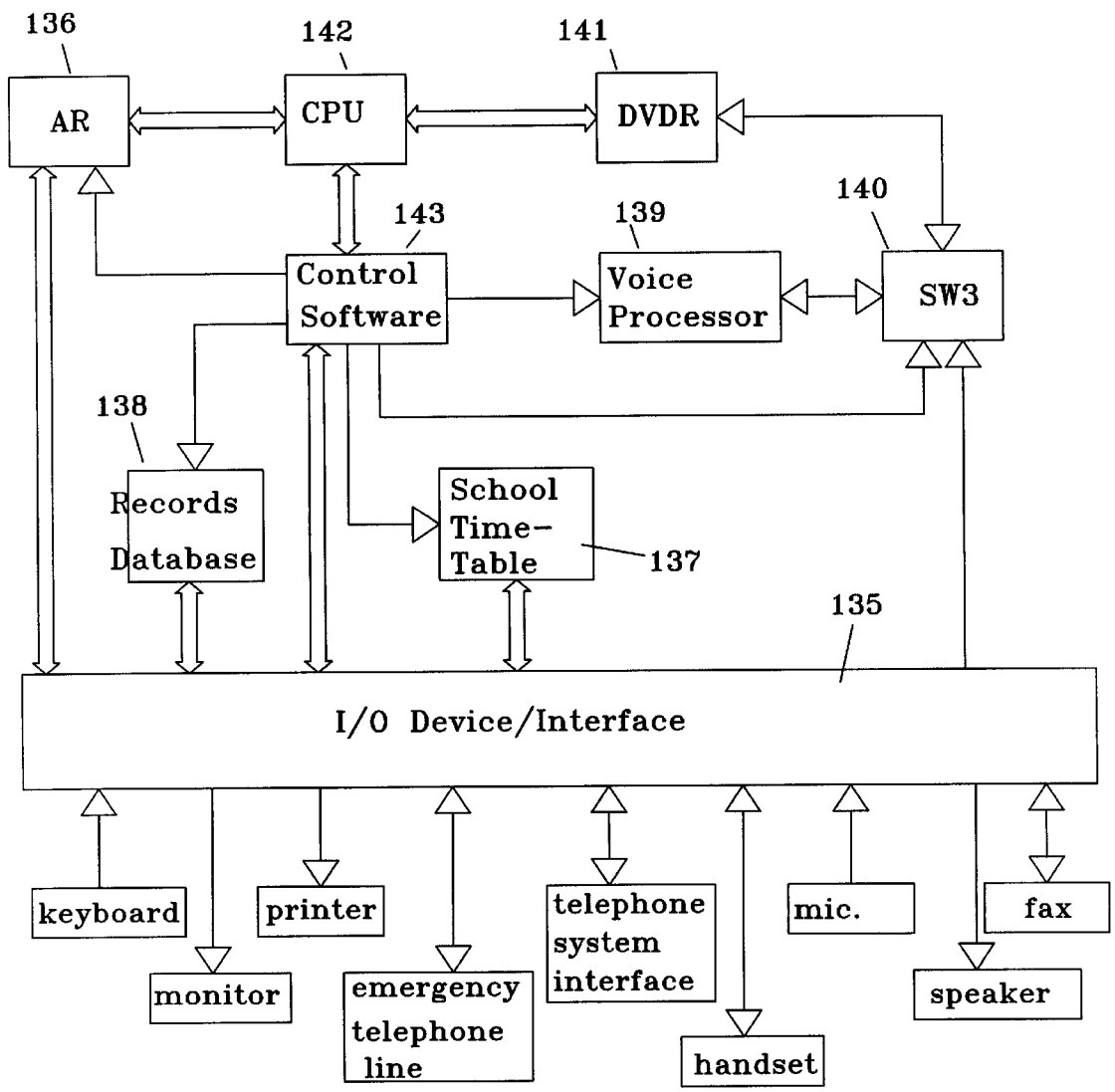

FIG. 4 is a detailed block diagram of the central office computer, showing a preferred structure.

Figure 5:
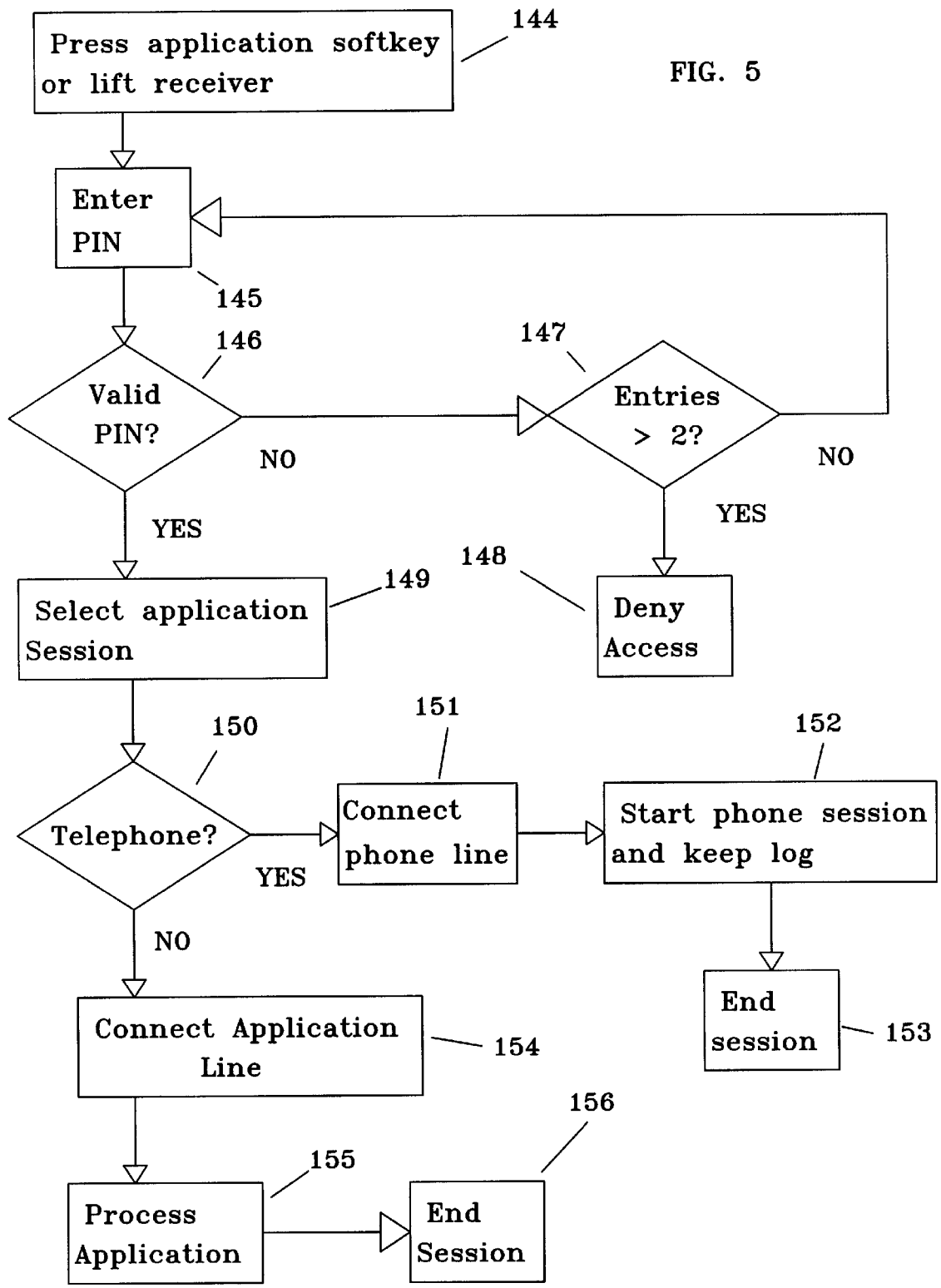

FIG. 5 is a detailed block diagram of a preferred version of the software structure required to enable the attendance telephone to interface with the central office computer for transmission of information to the central office computer.

Figure 6:
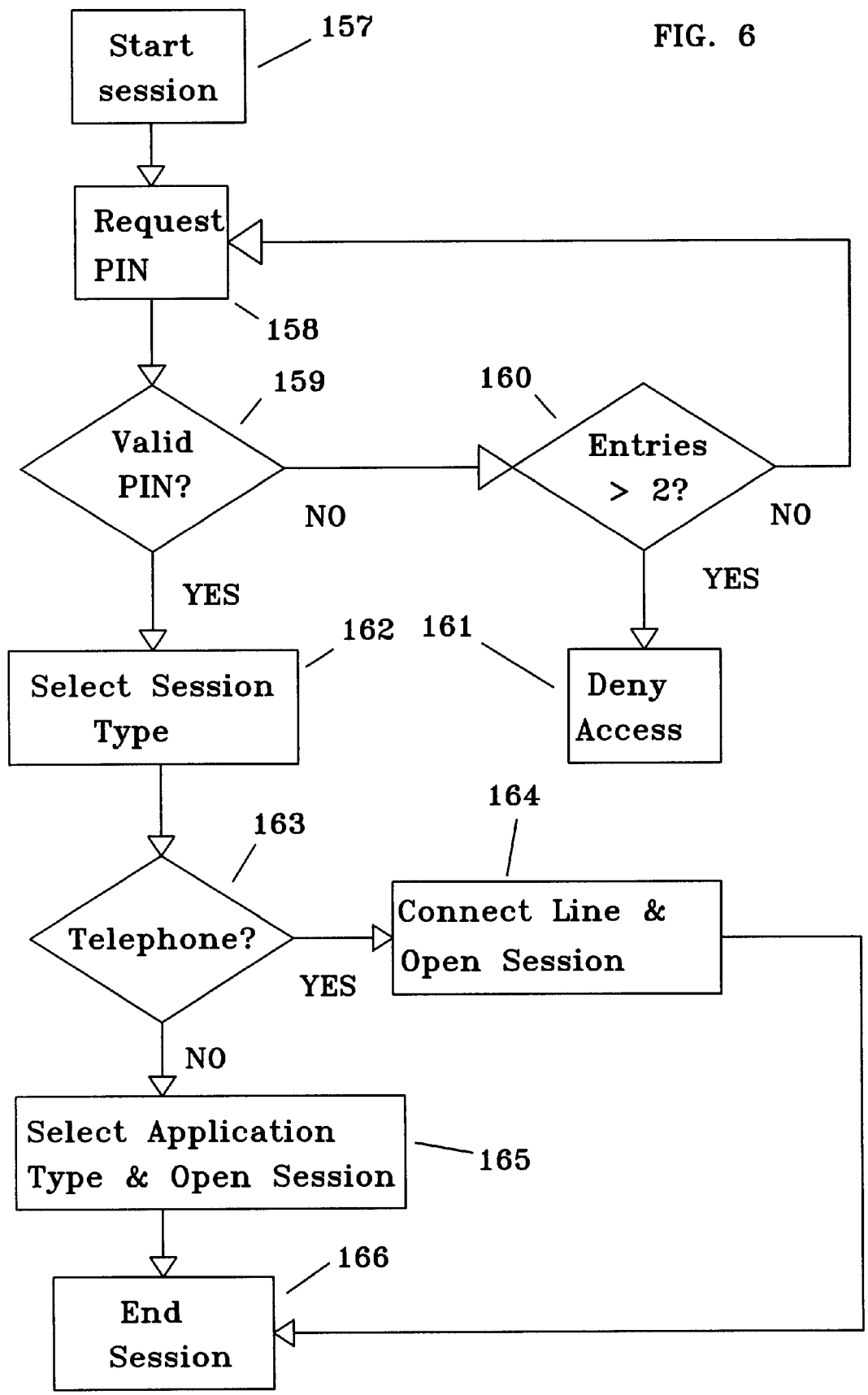

FIG. 6 is a detailed block diagram of a preferred version of the software structure required to enable the the central office computer to interface with the attendance telephone.

Figure 7A:
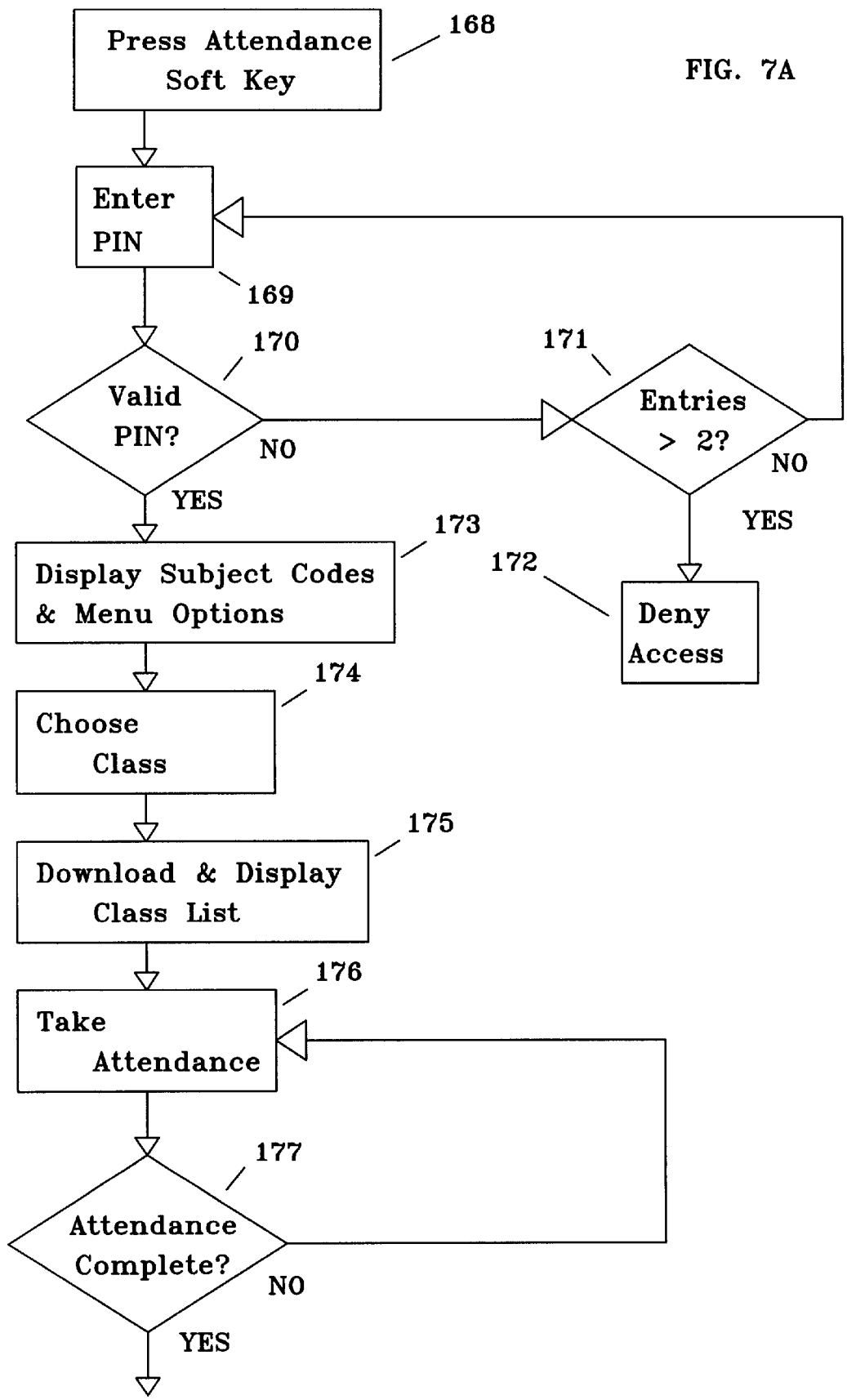
Figure 7A:
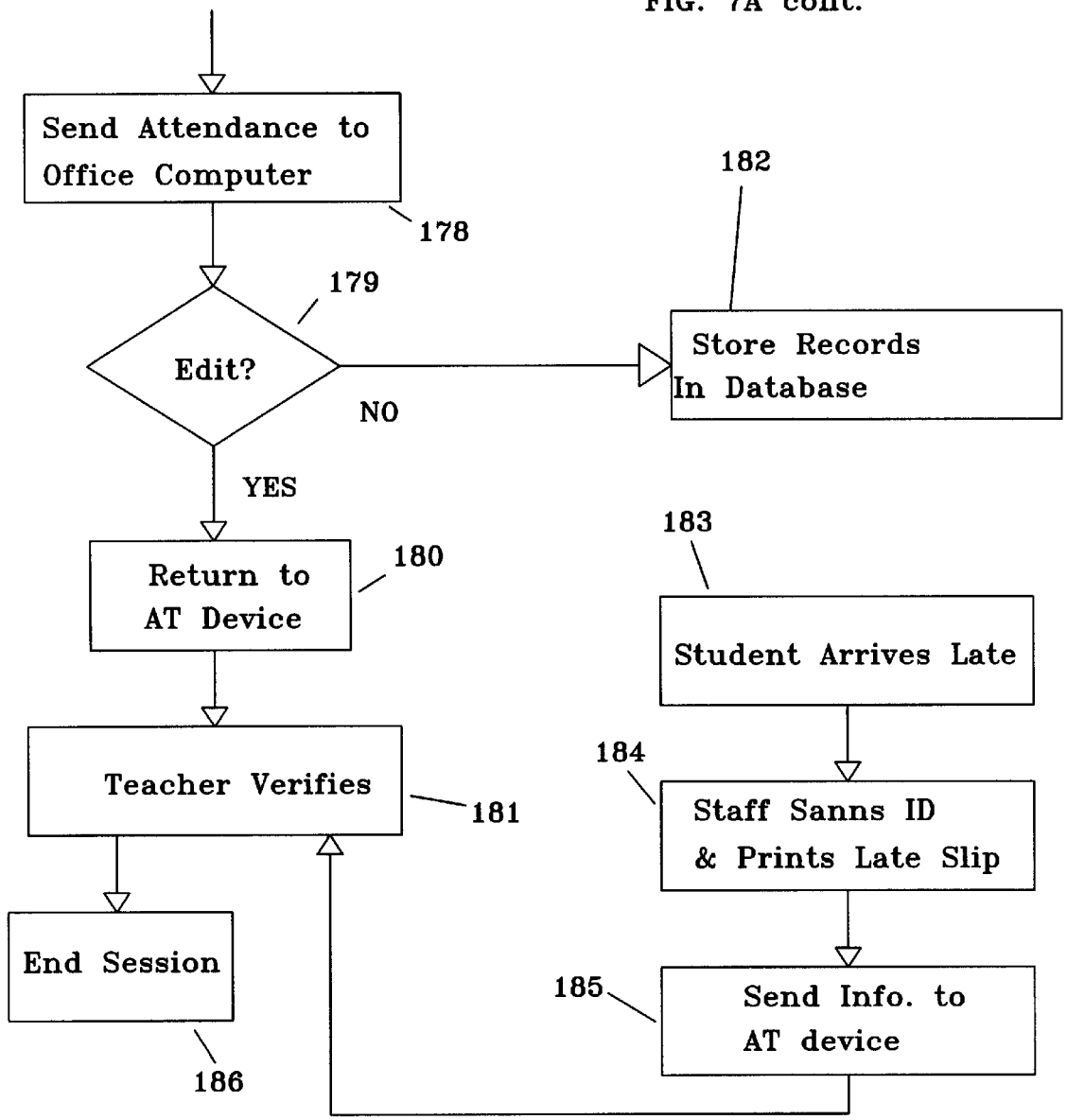

FIG. 7A is a detailed block diagram of a preferred version of the software structure required to enable the attendance telephone to be used to take attendance with interaction with the central office computer.

Figure 7B:
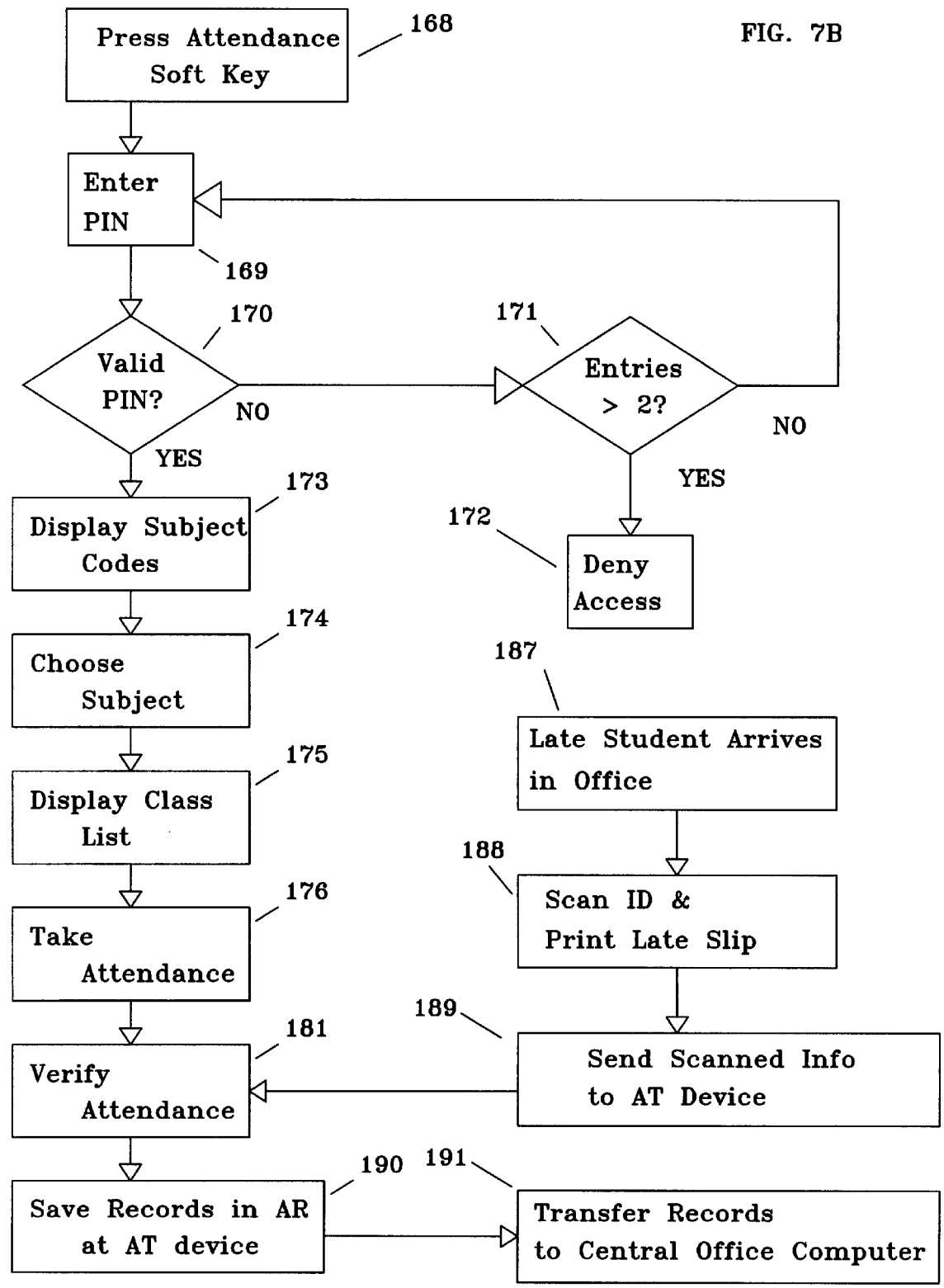

FIG. 7B is a detailed block diagram of a preferred version of the software structure required to enable the attendance telephone to be used to take attendance without interaction with the central office computer.

Figure 8:
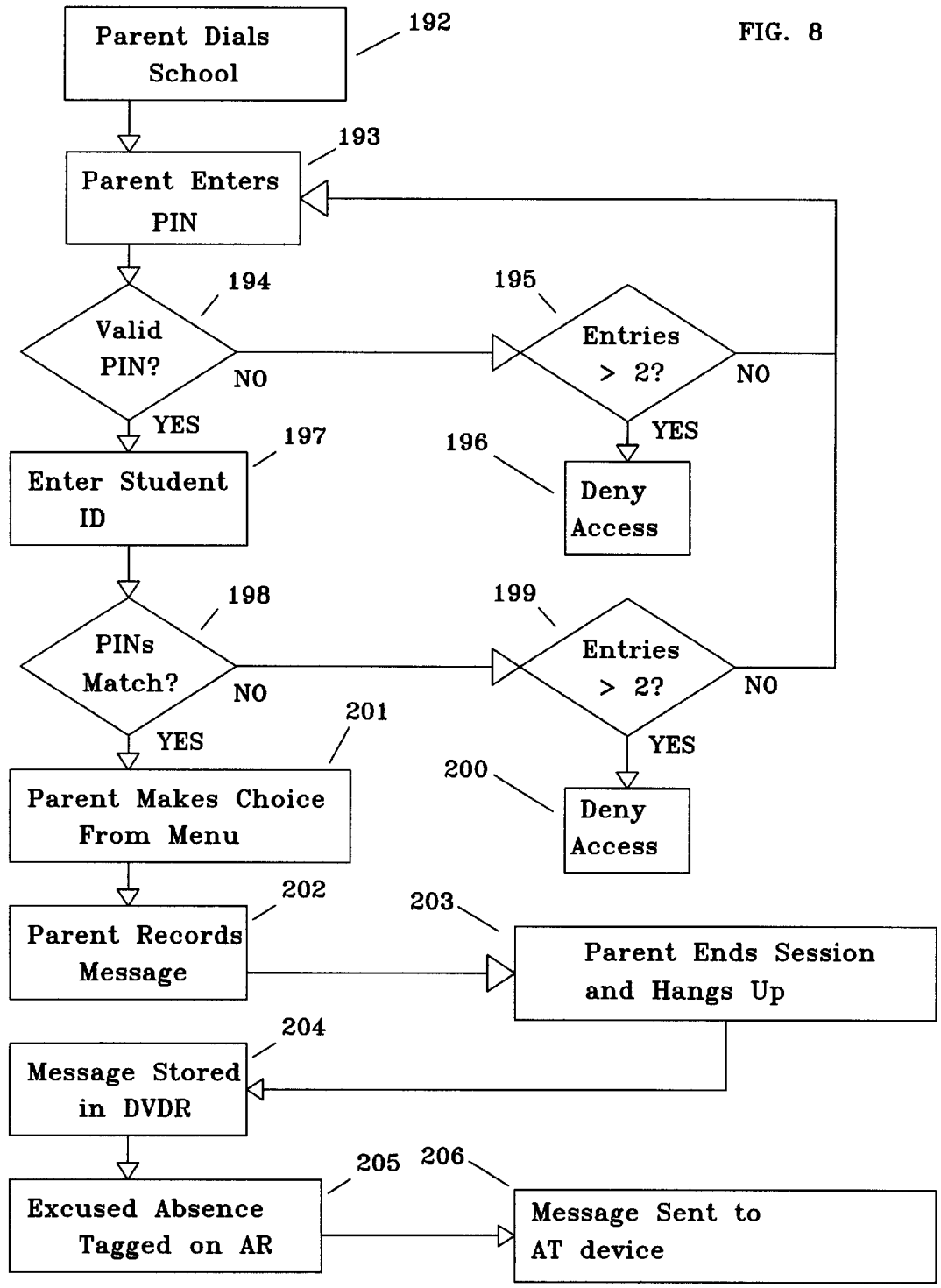

FIG. 8 is a detailed block diagram of a preferred version of the software structure required to allow a parent to telephone the central office computer and report an excused absence, and for the central office computer to transfer that information to the appropriate attendance telephone.

Figure 9:
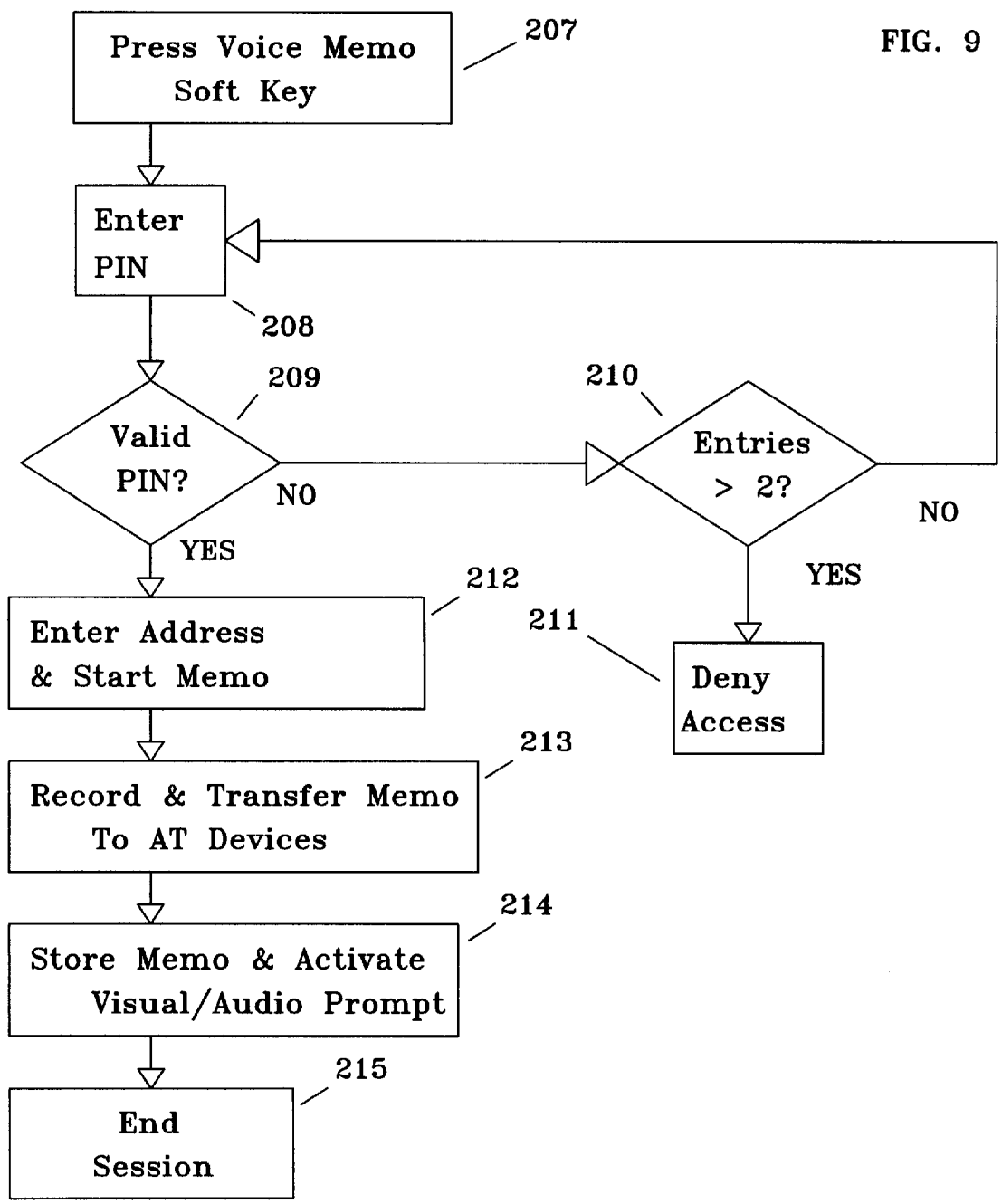

FIG. 9 is detailed block diagram of a preferred version of the software structure required to record voice mail/messages on the attendance telephone.

Figure 10:
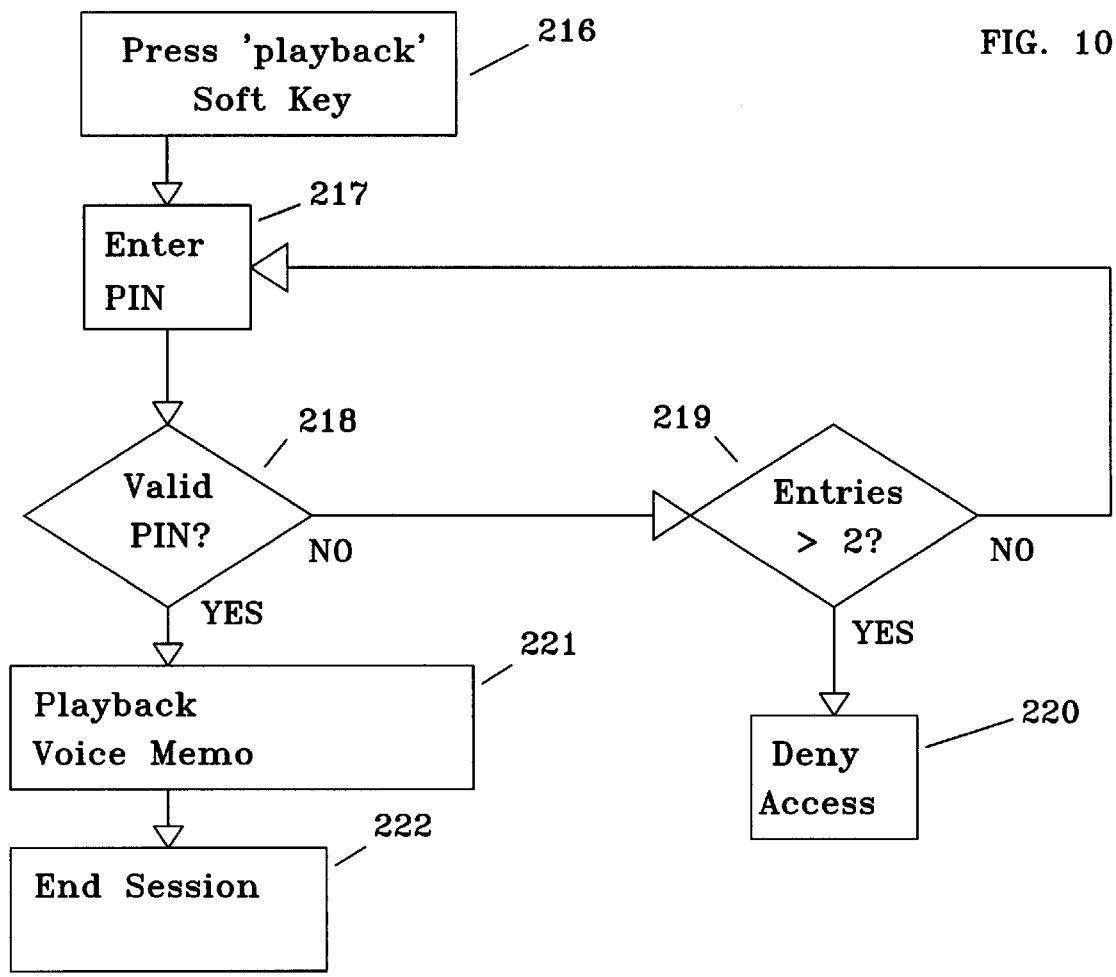

FIG. 10 is a detailed block diagram of a preferred version of the software structure required to playback recorded voice mail/messages on the attendance telephone.

Figure 11:
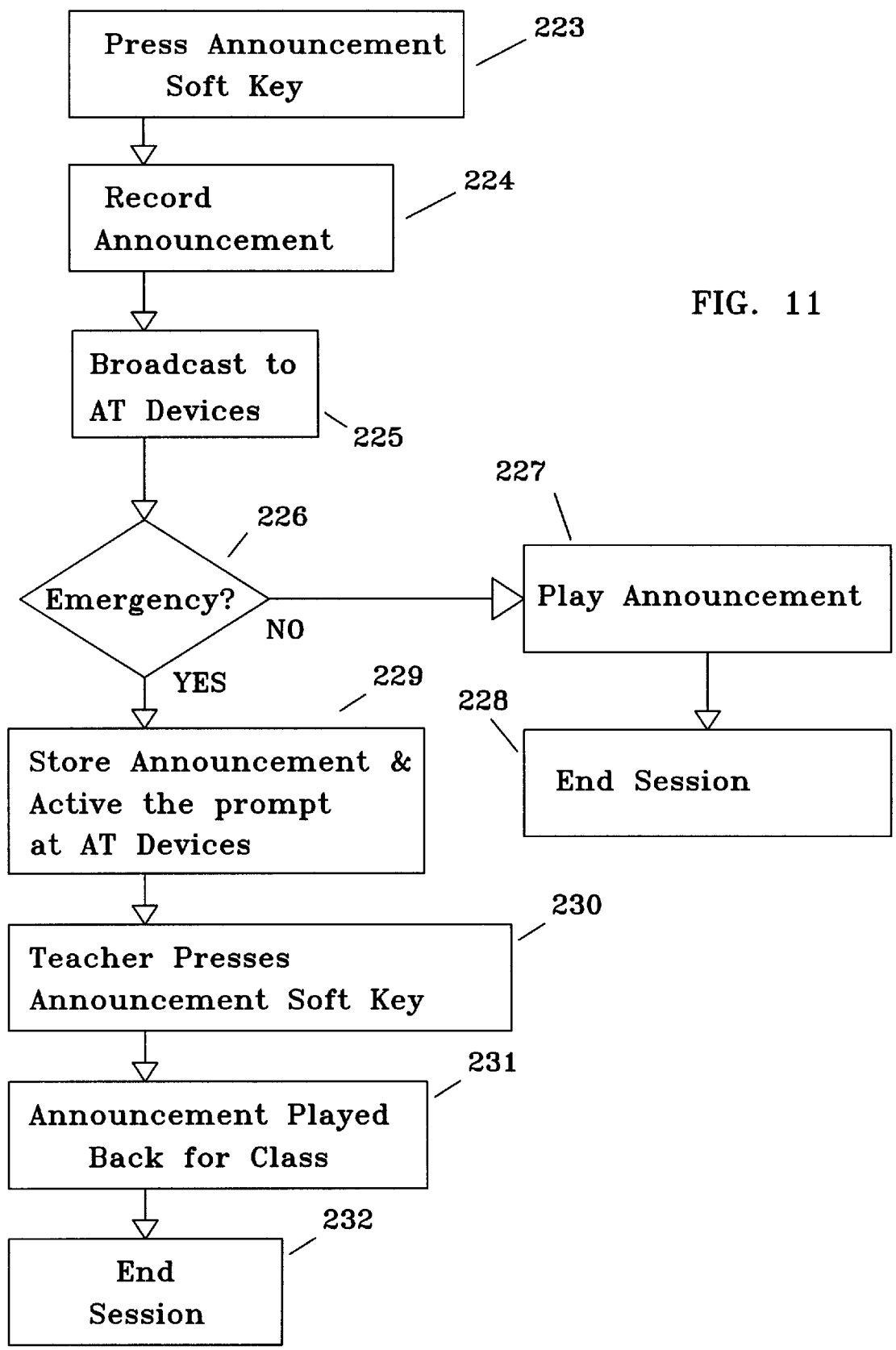

FIG. 11 is a detailed block diagram of a preferred version of the software structure required to record a verbal announcement on the central office computer, and transfer that announcement to an attendance telephone.

Figure 12:
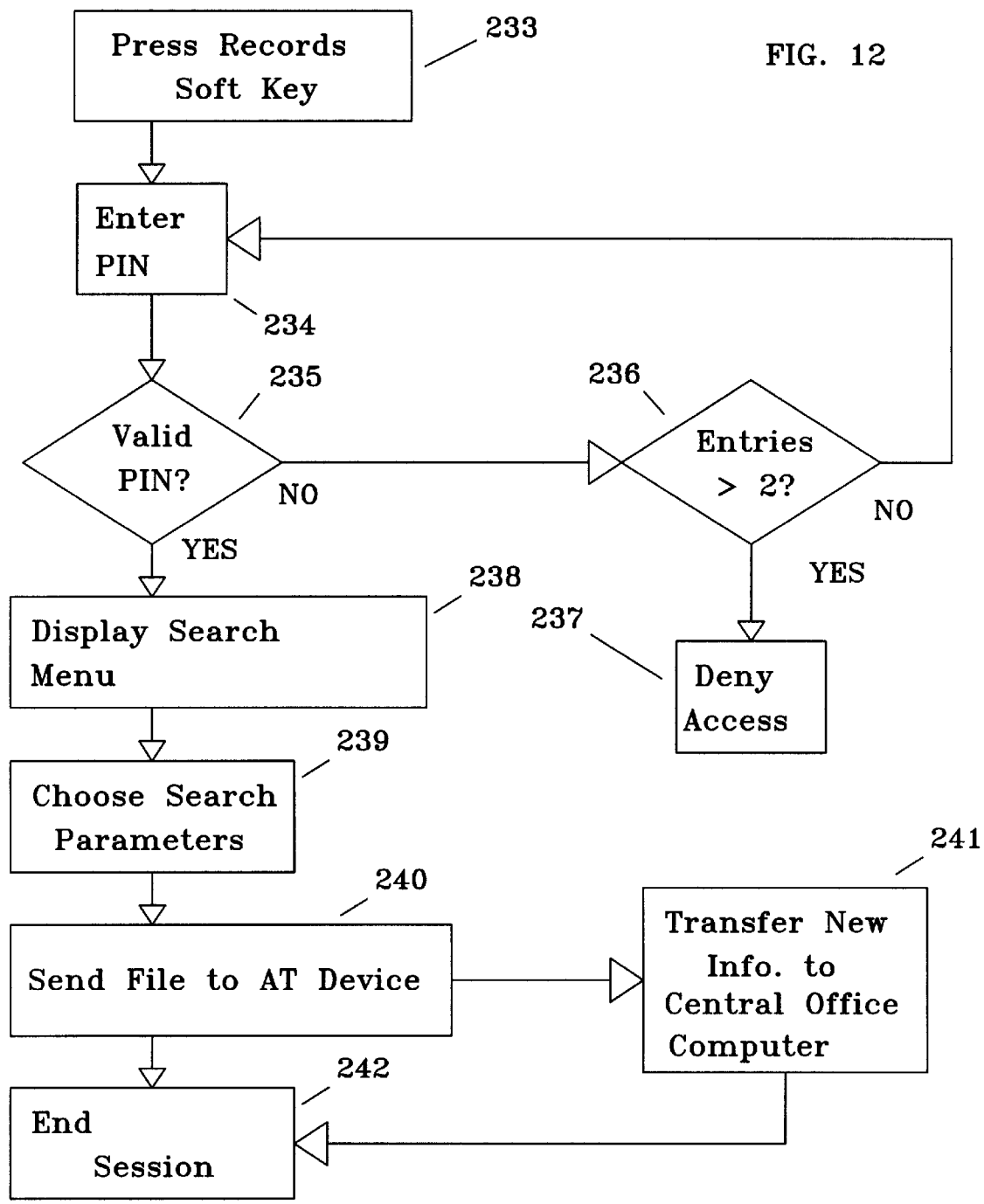

FIG. 12 is a detailed block diagram of a preferred version of the software structure required to allow a teacher using an attendance telephone to access databases resident on the central office computer.

Figure 13:
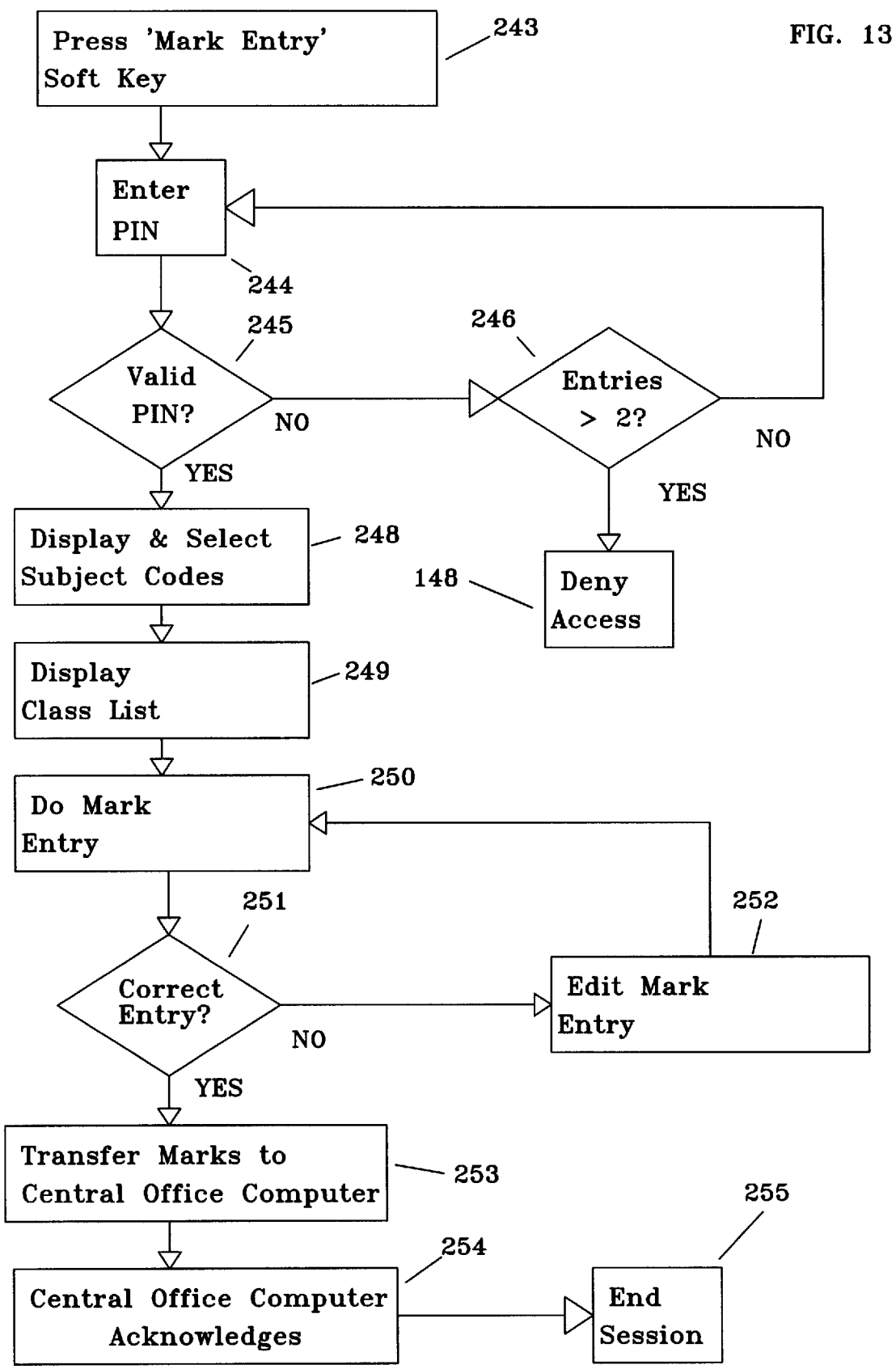

FIG. 13 is a detailed block diagram of a preferred version of the software structure required to allow a teacher using an attendance telephone to enter grades or marks associated with each student, and to have that information transferred to the central office computer.

DESCRIPTION

Figure 1:
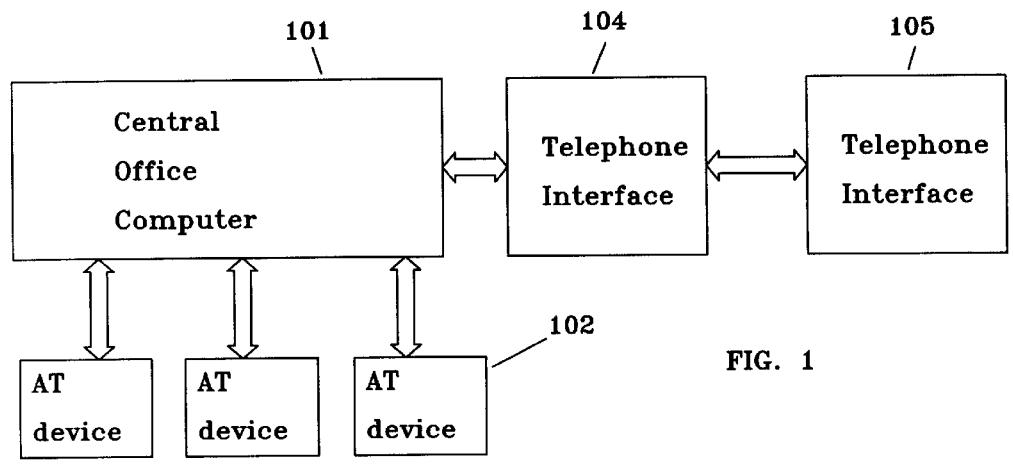
FIG. 1 is a generalized block diagram of a version of the system for taking school attendance and information transfer, showing the relationship of the central office computer, a plurality of attendance telephone devices, and a telephone interface through which the central office computer may communicate with outside computers.

Referring in particular generally to FIGS. 1 through 3, the physical structure of an apparatus for taking school attendance constructed in accordance with the principles of the invention is seen. The apparatus includes a central office computer 101 interfaced with a plurality of attendance telephones 102. Typically, the interface is based on telephone lines or similar hard-wired network. Each AT device may therefore communicate with the central office computer or another AT device by data transmitted through the central office computer. A telephone interface 104 allows the central office computer to connect to outside computers 105, including particularly the school district's central computer and database. Referring to FIGS. 4 through 13, the structure and organization of the software associated with the apparatus can be seen, which provides substantial functionality in addition to the taking, recording and transmitting of school attendance.

As seen in FIG. 2 each attendance telephone (AT) 102 includes a central processing unit (CPU) 127 in communications with an I/O device interface 128. Each AT device is associated with a unique address or identification code, so that it may be independently recognized by the central office computer or other AT devices. A control program 126 is executed by the CPU 127, and provides the required functionality. A keypad 111, interfaced with the I/O device interface 128, allows for the communication of data to the central processing unit. A preferred key pad includes the standard 12-key telephone pad, including the numbers 0 through 9 and "★" and "#", as well as a number of soft keys. Each soft key is a switching device which causes the CPU of the device to which it is attached, i.e. the central office computer or the attendance telephone, to execute a particular associated software routine. The nature, structure and functionality of those routines are described below.

An attendance register 108 is in communication with the central processing unit, and provides the storing data including student's names and associated data. The attendance register may be a file contained on a disk drive, or may be a small static RAM integrated circuit (IC). Similarly, a student's records register 106 may be RAM, static RAM or a file on a disk drive.

A voice control switches SW1 and SW2, 125, 134 control a voice processing unit (VPU) 110 and associated digital voice data register (DVDR) 107. As with the other registers, the DVDR may be RAM, disk or other memory storage unit. As seen in FIG. 2, data may be transmitted from the I/O device interface 128 through SW1 or SW2 into the DVDR for storage, or from the DVDR into the voice processing unit (VPU) 110 for playback.

Keyboard, printer/fax, cartridge I/O port and telephone line ports 129, 130, 131, 132 allow for the optional installation of these standard devices, using standard software drivers. The cartridge I/O port would allow for large applications on ROM memory and spare RAM memory to be provided. Such a cartridge would allow for the update, upgrade or replacement of the control program 126.

A telephone receiver 114, in communication with the I/O device interface allows for use of the AT 102 as a telephone and supports various messaging and data transfer functions, as will be seen. A microphone 112 and a speaker 113 can be used in place of the receiver, to provide hands-free functionality.

A visual display device 109 may include period timer display, and is in communication with the I/O device interface. The visual display device may display any text or graphics, and is typically an inexpensive liquid crystal device, although the more expensive screens common on lap-top computers could be substituted.

The period timer and clock display, which may be included within the visual display device 109, would include information such as the day, date, time, class period and subject and other relevant information.

A message indicator 124 may be light emitting diodes (LEDs) or similar indicator devices, or may be a partitioned area contained within the visual display 109. As seen in FIG. 2, the message indicator is driven by the digital voice and data register (DVDR) 107, and indirectly by SW1 and SW2, 125, 134.

Continuing to refer to FIG. 2, a voice control switch 125 connects the DVDR to the display unit 109 if the content of the data to be reviewed is a text memorandum or an announcement, which may also include graphics. The control switch 125 connects the DVDR to the voice processor 110 if the content to be reviewed is a voice memorandum. Control switch 134 connects data or digitized voice data to the DVDR for storage while switching analog signals to the VPU 110 for processing. The message indicator 124 alerts the teacher of a voice memorandum, text memorandum or an announcement that requires no urgency and which the teacher can read or list to at a later time.

Referring to FIG. 3, the structure of the voice processing unit (VPU) 110 is seen in greater detail. The voice processing unit 110 is in communication with a software control program 126 executed by the central processing unit, and provides for digitizing sound for storage and transmission as well as playback. Using the input from the microphone 112 or telephone receiver 114, as selected by switch 115, a low-power audio amplifier 116 is used to amplify the signal, if needed, before transmission to an analog to digital converter 117. The resulting digital data may be compressed by known compression algorithms by a voice compression unit 118. The data is then encrypted by encoding unit 119 before storage in the digital voice data register 107.

The voice processing unit also provides a decoder 120 for decoding data from the DVDR 107, and a data decompression device 121 for un-compressing the data. A digital to analog device 122 results in an analog signal which is boosted by audio amplifier 123 for playback in speaker 113.

A block diagram showing a preferred version of the central office computer 101 is seen in FIG. 4. A central processing unit (CPU) 142 executes control software 143. As seen in FIG. 4, the control software accesses an attendance register 136, a records database 138, a school time table 137 and a digital voice and data register 141. In a preferred embodiment, the attendance register, records database and school time table are files carried on a disk drive, but may alternatively be other data storage devices. The control software is similarly resident on the disk drive.

The attendance register contains the entire school register by student name and ID. It is updated at the beginning of the school year and during the school year to account for late registrations and transfers. The student records database contains individual student records by ID only.

An I/O interface 135 is in communication with control software executed by the CPU. The I/O interface provides the required ports for connection to a keyboard, monitor, printer, dedicated emergency telephone, a plurality of dedicated ports, each associated with an AT device 102, a telephone receiver, microphone, speaker and fax line. In a preferred embodiment, the data transfer means connecting the central office computer to each of the plurality of attendance telephone devices includes a telephone system interface including commercially available PBX-type devices.

The CPU additionally controls a switch 140 controlling the operation of the digital voice and data register 141 and associated voice processor 139. The voice processor 139 is controlled by software executed by the central processing unit and digitizes voice and sound information for storage and retrieval. A digital voice and data register 141 is in communication with the central processing unit, and stores voice and text information. The DVDR resident in the central office computer functions in a manner similar to the DVDR resident in the attendance telephones. However, the size of the DVDR in the central office computer is substantially larger than the DVDR in the attendance telephones.

The records database 138 is carried by a memory storage device in communication with the central processing unit. It stores student information, records and files. A school time table database 137 is also carried by a memory storage device in communication with the central processing unit, and stores school scheduling information, such as class times, subjects and locations.

As seen in FIG. 5, a preferred version of the apparatus for taking school attendance includes software, resident within each attendance telephone (AT), to support a session resulting in an AT device initiating and opening a connection to the central office computer. The session may be opened for the purpose of using the AT to make a telephone call, or for opening a software application which may be served to the AT from the central office computer. Referring to FIG. 5, the software supporting this functionality may be understood.

The session is initiated by a user pressing an application soft key or lifting the telephone receiver handset. The soft key or lifting the receiver causes a software validity routine 145 on the AT to prompt the user of the AT to enter a personal identification number (PIN). Entry of this code causes a validity check software routine 146 on the AT device to evaluate the validity of the code. If two sequentially entered PIN codes are invalid, a software routine 147 on the AT device executes a software routine 148 which denies access to the AT user, thereby ending the session.

If the PIN is valid, the central office computer sends an approval code, triggering a software routine 149 on the AT to present a menu prompting the user to select an application. A first menu choice 150 requires or prompts the user to select between making a telephone call and initiating or opening an application. Where the telephone receiver has been lifted, the AT device automatically selects the telephone call menu option, thereby causing a software routine 151 causes the device interface 128 to activate the telephone line port 132. A further software routine 152 monitors the call for length and calling area, for purposes of long distance charges. At the end of the telephone call, the user presses an end-of-session soft key 153, thereby closing the telephone connection.

Where the user desires to open an application, an application session is selected from a menu 149 by a soft key. In response to the input, a software routine 154 causes the central office computer to respond by transmission of the selected application 155, which is processed. The application may be of any type, and for any desired purpose. At the end of the application, the user presses an end-of-session soft key 156, thereby terminating the connection to the central office computer.

As seen in FIG. 6, a preferred version of the apparatus for taking school attendance includes software, resident within the central office computer to support a session resulting in connection to an attendance telephone. In this manner, information may be transmitted from the central office computer to any particular AT device, or to all AT devices simultaneously. To begin the session, an open session soft key 157 carried by the central office computer is pressed, triggering a request for the address of the AT device to which communication is desired. The user selects from among available AT device addresses.

A prompt 158 causes the user to enter a personal identification (PIN) code. A validity check software routine 159 then verifies the PIN code and for ending the session 161 if two invalid PIN codes 160 are received.

A software routine 162 displays a prompt or menu 163 urging the user to select between opening a telephone connection and opening an application. The user then selects a telephone session, a software routine 164 opens a line in an appropriate manner. Where the user requests an application, a menu 165 allows selection of a particular application. The application, once selected continues to operate until a end of session is indicated by the user pressing an end soft key 166, in communication with central processing unit of the central office computer, for ending the session.

As seen in FIG. 7A, a preferred version of the apparatus for taking school attendance additionally includes software, resident within attendance telephone, to support a session allowing a teacher to take and record attendance and to allow interaction between the attendance telephone and the central office computer. To begin the session, the teacher presses an attendance soft key 168, thereby triggering the software routine 168 to display a prompt 169 at which the user enters a PIN code, thereby verifying the session. A validity check routine 170 verifies the PIN code. A software counter 171 ends the session 172 if two invalid PIN codes are received.

Where the PIN code is valid, data reception and display routines, executed by the CPU of the attendance telephone and the CPU of the central office computer, receive a menu 173 from of central office computer and display it on the visual display means of the attendance telephone. The menu provides a routine, in communication with the CPU of the attendance telephone, for allowing the user to select a menu entry 174 from among the choices of the menu, and for resulting in the display of a list of students in a class 175.

The teacher then presses one of a plurality of soft key status indicators 176, in communication with the CPU of the attendance telephone, to associate with each student on the list a status indicator code for "present," "absent," "excused absence" or other circumstance. For example, where a student is present, the "present" soft key would be pressed, thereby associating that status with the student, and the routine 176 would then highlight the next student on the list. Where routine 177 determines that the attendance-taking process is complete, the teacher presses the send soft key 178 and the file is transmitted to the central office computer.

An integrity routine 179 on the central office computer checks for errors in the attendance file, such as failure to assign a status with some student. Where no error are discovered, a routine 182 stores the list. Where an error is discovered, a routine 180 returns the list to the AT device for reevaluation. A routine 181 on the AT then redisplays the list for correction and/or verification and allows the user to edit any mistakes, as needed, and would ensure that each student was associated with an attendance status. A further routine then sends list to the central office computer, where a routine 186 then ends the session.

A late-arriving student 183 is directed to the central office for a late slip. An office staff scans or otherwise input the student's ID, and prints out a late slip 184. The scanned information is sent directly to the AT device by a software routine 185. The correction or verification routine 181 then allows the teacher to confirm the late arrival of the student, and the session may be ended by the teacher who presses an end soft key 186 causing an associated routine to end the session.

As seen in FIG. 7B, a further version of the apparatus for taking school attendance additionally includes software, resident within attendance telephone, to support a session allowing a teacher to take and record attendance and to without requiring interaction with the central office computer. This circumstance in particularly the case where such interaction would overly tax the CPU of the central office computer, due to the number of AT devices supported by the central office computer. As was the case before with interaction with the central office computer, the attendance-taking session begins with the teacher presses an attendance soft key 168, in communication with the CPU of the attendance telephone for triggering the software to prompt 169 a user to enter a PIN code. Similar validity check routines 170, software counter 171 and end sessions routines 172 are provided. The menu 174 and class lists displayed 175 are the same, as is the attendance taking functionality using soft keys 176 and the looping software routine 177.

Following the verification routine 181, in which integrity checks are made on the attendance list, verifying for example, that each student has been assigned a status, the verified list is then saved in the attendance register memory 108 within the attendance telephone 104 by a software routine 190.

At intervals, when the central office computer is not overly busy, a software routine 191 on the central office computer will open a connection to the AT and transfer the stored records from the attendance register 108 of the AT 104 to the central office computer for storage.

Where a late arriving student 187 arrives in the office, the student's ID is scanned and a late slip 188 printed out. The late slip is then scanned and the information transmitted to the AT device 189.

As seen in FIG. 8, the apparatus for taking school attendance of claim 1, additionally includes software, resident on the central office computer, to support a session allowing a parent of a student to report an excused absence. A preferred version of the software includes support for a modem 192, in communication with the I/O interface 135 of the central office computer 101, for answering a telephone call from the parent. Validity check software includes a menu prompt 193 which prompts the parent to enter a personal identification number (PIN) code, and a software routine 194 provides a first validity check for verifying that a transmitted by the parent is valid. A software counter 195 jumps to the end of the session 196 if two invalid PIN codes are received.

A second validity check routine 198 verifies that a student ID code 197 transmitted by the parent is valid, also provides a counter 199 for jumping control to the end of the session 200 if two invalid student ID codes are received.

Where the parent successfully enters a correct PIN number and student number for the child. a menu routine 201 presents the parent with several selection options, thereby allowing the parent to select an excused absence function. Following selection of the appropriate option, the parent may then verbally give the reason for the child's absence, typically including name, class, date and reason for absence. A software routine 202 digitizes the parent's response, and prepares the data stream for storage in a file in the DVDR 141. When the parent hangs up, a software routine 203 closes files appropriately and resets the modem 192. A further software routine 204 transfers the digital file to the DVDR for later retrieval. A status change software routine 205 associates the student and the student's ID code with an excused absence, and a file transfer routine 206 transfers this information to the appropriate AT devices associated with all of the student's different class period teachers.

After the file's transfer to the AT device, the teacher may access the file for audio playback by pressing the excused data soft key on the AT device, which plays back any files transferred to the AT.

Alternatively, the parent may select a menu option from menu routine 201 allowing the parent to retrieve recorded information left by the student's teacher or school administrators regarding, grades, assignments, behavior or other relevant topic.

As seen in FIG. 8, a preferred version of the apparatus for taking school attendance additionally includes software, resident within attendance telephone, to support a session allowing the recording of a voice memorandum. The session is started when the teacher presses the voice memo soft key 207, in communication with the CPU of the AT device, which activates an associated software routine.

A menu prompt 208 causes the teacher to enter a personal identification number (PIN) code, and a software routine 209 provides a first validity check for verifying that a transmitted by the parent is valid. A software counter 210 jumps to the end of the session 211 if two invalid PIN codes are received.

A destination control software routine 212 prompts the user to input the address of at least one attendance telephone or the central office computer to which the memorandum will be sent. A preferred prompt includes a choice between "single recipient," "multiple recipients" or "group" or "committee" recipients. Where a single or multiple recipient(s) are selected, those address(es) must be supplied. However, built in groups of addresses can preprogrammed, and therefore be selected without having to key in all addresses. For example, the group "History Faculty" would be a preprogrammed group of all history teachers.

A software routine 213 then digitizes the verbal memorandum using the voice processing unit hardware 110 of the AT device 104. The software routine 213 then transfers the file to the appropriate AT device(s) 104 using known file transfer protocols. A further software routine 214 activates the visual prompts on the visual display 109 on each affected AT device. Shut down routine 215 closes the appropriate files and terminates the session.

As seen in FIG. 9, a preferred version of the apparatus for taking school attendance additionally includes software, resident within attendance telephone, to support a session allowing the playback of a voice memorandum. The session is started when the teacher presses the playback memo soft key 216, in communication with the CPU of the AT device, which activates an associated software routine.

Validity check software includes a menu prompt 217 causes the teacher to enter a personal identification number (PIN) code, and a software routine 218 provides a first validity check for verifying that a transmitted by the parent is valid. A software counter 219 jumps to the end of the session 220 if two invalid PIN codes are received.

Where the teacher enters a valid PIN code, playback software 221 converts the stored digitized file to an analog signal which may be directed through the speakers 113 or telephone receiver 114. The session may be ended by pressing a end soft key 222.

As seen in FIG. 11, a preferred version of the apparatus for taking school attendance additionally includes software, resident within the central office computer, to support a session allowing an announcement to be transmitted from the central office computer to one or more attendance telephone devices.

To start the announcement session, the office staff individual would press the announcement soft key 223 carried by the central office computer. Typically, a validity check routine would verify a PIN code entered by the user for validity, and would end the session if two invalid PIN codes are received. A recording and storage software routine 224 would then record the verbal announcement, which would be digitizing by the voice processor 139 of the central office computer 101 and stored as a file in the DVDR 141 of the central office computer. A further file transfer software routine 225 would then broadcast copies of the digitized announcement to at least one AT device 104.

Where a code sequence or flag carried by the transferred file indicated that the announcement was of an urgent or emergency nature, a software routine 226 receiving the file on the attendance telephone would automatically call a playback software routine 227 which would immediately play the announcement. Routine 228 would then close files appropriately and end the session.

Where the flag carried by the transferred file does not indicate an emergency, a file storage software routine 229 would store the file appropriately and activate an indicator prompt on the visual display 109 of the AT device, thereby indicating that an announcement file is available for playback. Upon noticing the indicator prompt, the teacher may press an announcement soft key 230, thereby executing an announcement playback software routine 231 which plays back the announcement. Pressing the end soft key 232 ends the session.

To report an emergency situation that takes place in a classroom, the teacher presses an "emergency" soft key and enters his/her PIN. This causes a coded emergency alert sequence to be sent to the central office computer. Upon receipt of an emergency signal the central office computer verifies the PIN and grants access by opening the telephone line port 132.

To make an announcement and record a homework assignment during a class, the teacher presses the "announcement" soft key followed by the "record" soft key, thereby activating software associated with these activities. The class, subject and class period are specified followed by the actual announcement which is automatically digitized, forming a file which is stored in the DVDR 107. The end soft key is pressed to terminate the recording.

Performance and behavior reports on students are recorded in the same was as memoranda, for transfer to parents via the central office computer. The report may include such information as class period and the ID number of the student. In order to prevent the report from being intercepted by a student, a recorded message is first sent to the parent by the central office computer requesting the parent to call the school. The parent calls and retrieves the report using the same procedure for reporting an excused absence, except that "report" is selected from the menu. When the report is accessed and played back, the parent is offered an opportunity to record, in the same way as an excused absence report. If by the following day the teacher does not find a feedback on his/her AT device, an attempt is made to reach the parent.

As seen in FIG. 12, a preferred version of the apparatus for taking school attendance additionally includes software, resident within attendance telephone, to support a session allowing a database access. Such a session allows for the retrieval from the central office computer of student personal records as well as school-related information by an individual teacher. The purpose is to provide teachers with a quick and efficient method to obtain information needed to help in common tasks such as student home contact data or locating teachers who share a common student for investigation of matters of concern. Valuable student information that would be made available includes: current parent home and work telephone numbers; cumulative attendance records in other classes; current excused absence information; communication of student concerns by staff to specific teachers; and history of discipline attempts by teachers and administration in regards to detentions, suspensions, etc.; staff directory information; important school dates; grade related information; and other data, as deemed appropriate.

The database functionality of FIG. 12 would allow the above information to be transferred and displayed at the requesting teacher's AT device for quick and convenient viewing. To initiate the session requesting information, the teacher presses the "records" soft key 233, thereby directing the CPU of the AT device to execute the database session. A prompt 234 requests the teacher's PIN. A validity check routine 235 evaluates the teacher's input, and a software counter 236 executes code 237 denying access and ending the session after two failures to key in the correct PIN.

Where a correct PIN has been entered, a display search menu 238, transmitted by the central office computer to the attendance telephone, provides a list of search parameters from which the teacher may select. The teacher then selects one of the search parameters from the display search menu, resulting in the execution of a software routine 239 which searches databases resident on the central office computer. A file transfer routine 240 sends the file to the AT device. If desired, an editor 241 or other update program allows the teacher to make file updates and corrections, and to send the file back to the central office computer. An end soft key 242 closes the appropriate files and exits the session.

As seen in FIG. 13, a preferred version of the apparatus for taking school attendance additionally includes software, resident within attendance telephone, to support a session allowing entry of student's grades into a file on the central office computer. The session may be initiated by pressing a "grade entry" soft key 243, in communication with the CPU of the AT device. A prompt 244 requests the teacher's PIN. A validity check routine 245 evaluates the teacher's input, and a software counter 246 executes code 247 denying access and ending the session after two failures to key in the correct PIN. A menu of subject codes 248 allows the teacher to select from among several classes. Selection of any subject results in a menu 249 of students names in that class.

An editor or similar grade entry routine 250 allows the grades to be entered in association with each of the students on the list of students associated with the class selected, whereby an updated list of students and grades is produced. Verification 251 and re-entry 252 code allows the teacher to correct any mistakes. A "send" soft key 253 initiates a software routine on the AT device 104 which causes the updated list of students and grades to be transferred to the central office computer. A short routine 254 on the central office computer sends a message of acknowledgement to the AT device. An "end" soft key 255 closes files as appropriate and ends the session.

Roaming refers to a session that is initiated at an AT device other than that of the teacher's classroom. A typical example is an attendance session initiated at the school library. To facilitate roaming one or more AT devices are located in the library; all teachers are permitted to access the central office computer from any of the AT devices. The sequence of operations involved in accessing the central office computer during roaming is almost the same as that involved in accessing the central office computer from the teacher's classroom AT device. The only difference is that the teacher must first depress a "roaming" soft key before entering his/her PIN and the address of his/her classroom AT device. This ensures that all necessary data or information is transferred by the central office computer to the teacher's classroom AT device for future use by the teacher.

The basic hardware configuration and operating software are set up during the manufacturing process. However, variations to customize for specific school systems are added at the time of system installation. The added variations may be overwritten as needed, as the devices are moved or their tasks otherwise changed.

When the central office computer and all the AT devices are first installed and powered up, the central office computer transmits a signal to activate the software programs, set the clocks and period timers at all the AT devices. Following this, specific variations of the local software programs and operating systems are installed on the central office computer by CD or floppy disk and the control program transfers software to the AT devices. When this is complete, a database of the school register containing individual class lists is installed on the central office computer. Unique PINs are assigned to each teacher, and unique addresses are assigned to each AT device, and are stored on the central office computer. Appropriate portions of this data is then transferred to each AT device.

The previously described versions of the present invention have many advantages, 11 including a primary advantage of providing a novel apparatus and method of use for efficiently taking classroom attendance, creating computer files with that information, and transmitting those files.

Another advantage of the present invention is to provide a novel apparatus and method for producing and relaying audio recordings, typically related to school business, such as class announcements and assignments.

A still further advantage of the present invention is to provide a novel apparatus and method for allowing parents to transmit information to, and receive information from, a central office computer in a secure manner.

The invention resides not in any one of these features per se, but rather in the particular combination of all of them herein disclosed and claimed and it is distinguished from the prior art in this particular combination of all of its structures for the functions specified.

Although the present invention has been described in considerable detail and with reference to certain preferred versions, other versions are possible. For example, while preferred flow charts for each major software function have been provided, it is clear that a number of logical equivalents could be designed. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus for taking school attendance, comprising:
   (A) a plurality of attendance telephone devices, each attendance telephone comprising:
       (a) a central processing unit (CPU) in communications with an I/O device interface;
       (b) keypad means, in communication with the I/O device interface, for communicating data to the central processing unit, comprising:
           (i) a 12-key pad; and
           (ii) a plurality of soft keys;
       (c) attendance register means, in communication with the central processing unit, for storing data associated with student's names,
       (d) a telephone receiver, in communication with the I/O device interface;
       (e) a period timer display, in communication with the I/O device interface;
       (f) voice processing means, in communication with a software control program executed by the central processing unit, for digitizing sound for storage and transmission; and
       (g) visual display means, in communication with the I/O device interface, for displaying textual and graphical information;
   (B) a central office computer, comprising:
       (a) a central processing unit (CPU);
       (b) an I/O interface, in communication with control software executed by the CPU;
       (c) records database means, carried by a memory storage device in communication with the central processing unit, for storage of student information;
       (d) time table database means, carried by a memory storage device in communication with the central processing unit, for storage of school scheduling information;
       (e) voice processing means, in communication with control software executed by the central processing unit, for digitizing voice and sound for storage and retrieval; and
       (f) digital voice and data register means, in communication with the central processing unit, for storing voice and sound information; and
   (C) data transfer means, connecting the central office computer to each of the plurality of attendance telephone devices, for the two-way transmission of data between the central office computer and the plurality of attendance telephone devices.

2. The apparatus for taking school attendance of claim 1, additionally comprising software, resident within each attendance telephone, to support a session resulting in connection to the central office computer, comprising:

(a) software means, triggered by the lifting of the telephone receiver or the pressing of an application soft key, to prompt a user to enter a PIN code;

(b) validity check means for verifying the PIN code and for ending the session if two invalid PIN codes are received;

(c) prompt means, driven by the software, for urging the user to select between software applications; and (d) end soft key means, in communication with the I/0 device interface, for terminating the connection to the central office computer.

3. The apparatus for taking school attendance of claim 2, additionally comprising software, resident within the central office computer, to support a session resulting in connection to an attendance telephone, comprising:

(a) access soft key means, in communication with the central processing unit of the central office computer, for triggering the software to prompt a user to enter a PIN code;

(b) validity check means for verifying the PIN code and for ending the session if two invalid PIN codes are received;

(c) prompt means, driven by the software, for urging the user to select between opening a telephone connection and opening an application; and (d) end soft key means, in communication with central processing unit of the central office computer, for ending the session.

4. The apparatus for taking school attendance of claim 3, additionally comprising software, resident within attendance telephone and on the central office computer, to support a session allowing a teacher to take and record attendance and to allow interaction between the attendance telephone and the central office computer, comprising:

(a) attendance soft key means, in communication with the CPU of the central office computer, for triggering the software to prompt a user to enter a PIN code;

(b) validity check means for verifying the PIN code and for ending the session if two invalid PIN codes are received;

(c) data reception and display means, executed by the CPU of the attendance telephone and the CPU of the central office computer, for receiving a menu from of central office computer and displaying it on the visual display means of the attendance telephone;

(d) selection means, in communication with the CPU of the attendance telephone, for allowing the user to select a menu entry from among the choices of the menu, and for resulting in the display of a list of students in a class;

(e) status indicator means, in communication with the CPU of the attendance telephone, for allowing the user to add to the list an attendance status for each student;

(f) send soft key means, in communication with the CPU of the attendance telephone, for allowing the user to transmit the list of students, together with each student's attendance status, to the central office computer; and (g) end soft key means, in communication with the CPU of the attendance telephone, for allowing the user to end the session.

5. The apparatus for taking school attendance of claim 4, additionally comprising software, resident within attendance telephone, to support a session allowing a teacher to take and record attendance, comprising:

(a) attendance soft key means, in communication with the CPU of the attendance telephone, for triggering the software to prompt a user to enter a PIN code;

(b) validity check means for verifying the PIN code and for ending the session if two invalid PIN codes are received;

(c) data transfer and display means, executed by the CPU of the attendance telephone, for displaying a menu on the visual display means of the attendance telephone;

(d) selection means, in communication with the CPU of the attendance telephone, for allowing the user to select a menu entry from among the choices of the first menu, and for resulting in the display of a list of students in a class;

(e) status indicator means, in communication with the CPU of the attendance telephone, for allowing the user to add to the list an attendance status for each student; and (f) software routine means, resident on the central office computer, for initiating the transmission of the list of students, together with each student's attendance status, to memory contained within the central office computer.

6. The apparatus for taking school attendance of claim 5, additionally comprising software, resident within central office computer, to support a session allowing a parent to report an excused absence, comprising:

(a) modem means, in communication with the I/O interface of the central office computer, for answering a telephone call from the parent;

(b) first validity check means for verifying a PIN code transmitted by the parent is valid and for ending the session if two invalid PIN codes are received;

(c) second validity check means for verifying a student ID code transmitted by the parent is valid and for ending the session if two invalid student ID codes are received;

(d) menu presentation means for presenting the parent with several selection options and allowing the parent to select an excused absence function;

(e) recording and storage means for recording and storing the parent's verbal excuse for the student's absence;

(f) status change means for associating the student and student ID code with an excused absence;

(g) update means for transmitting the excused absence information to the appropriate attendance telephone; and (h) excused data soft key means, carried by the AT device, for playing back excused absence information.

7. The apparatus for taking school attendance of claim 6, additionally comprising software, resident within attendance telephone, to support a session resulting in the recording of a voice memorandum, comprising:

(a) voice memo soft key means, in communication with the CPU of the attendance telephone, for starting the session;

(b) validity check means for verifying a PIN code transmitted by the user is valid and for ending the session if two invalid PIN codes are received;

(c) destination control means for allowing the user to input the address of at least one attendance telephone or the central office computer;

(d) recording means for digitizing and storing the user's verbal message; and (e) file transfer means for transferring the digitized and stored verbal message to the at least one attendance telephone or the central office computer.

8. The apparatus for taking school attendance of claim 7, additionally comprising software, resident within an attendance telephone, to support a session resulting in playback of a recorded voice memorandum, comprising:
- (a) playback soft key means, in communication with the CPU of the central attendance telephone, for starting the session;
- (b) validity check means for verifying a PIN code transmitted by the user is valid and for ending the session if two invalid PIN codes are received; and
- (c) play means for playing the recorded voice memorandum.

9. The apparatus for taking school attendance of claim 8, additionally comprising software, resident within central office computer, to support a session resulting in a digitized announcement being transferred from the central office computer to at least one attendance telephone, comprising:
- (a) announcement soft key means, in communication with the CPU of the central office computer, for starting the session;
- (b) validity check means for verifying a PIN code transmitted by the user is valid and for ending the session if two invalid PIN codes are received;
- (c) recording and storage means, in communication with the CPU of the central office computer, for recording and storing the digitized announcement;
- (d) file transfer means for transferring the digitized announcement to at least one attendance telephone;
- (e) code sequence means, carried by the digitized announcement, for indicating an emergency announcement;
- (f) file storage means, carried by the at least one attendance telephone, for storing the digitized announcement;
- (g) indicator means, carried by the attendance telephone, for indicating that a digitized announcement has been received; and
- (h) code sequence decoding means, executed by the CPU of the attendance telephone, for determining if the digitized announcement is an emergency announcement, and for playing the digitized announcement immediately if it is an emergency announcement.

10. The apparatus for taking school attendance of claim 9, additionally comprising software, resident within attendance telephone, to support a session enabling a teacher using an attendance telephone to access a database resident on the central office computer, comprising:
- (a) records soft key means, in communication with the CPU of the attendance telephone, for starting the session;
- (b) validity check means for verifying a PIN code transmitted by the user is valid and for ending the session if two invalid PIN codes are received;
- (c) display search menu means, transmitted by the central office computer to the attendance telephone, for providing a list of search parameters;
- (d) file transfer means, executed by the CPU of the central office computer and the CPU of the attendance telephone, for transferring to the attendance telephone a desired file;
- (e) update means, executed by the CPU of the attendance telephone, for allowing changes to be made to the desired file, thereby producing an updated file;
- (f) send soft key means, in communication with the CPU of the attendance telephone, for transferring to the central office computer the updated file; and
- (g) end soft key means, in communication with the CPU of the attendance telephone, for terminating the session.

11. The apparatus for taking school attendance of claim 10, additionally comprising software, resident within attendance telephone, to support a session allowing a teacher to enter a grade associated with a student's record into a file on the central office computer, comprising:
- (a) grade entry soft key means, in communication with the CPU of the attendance telephone, for starting the session;
- (b) validity check means for verifying a PIN code transmitted by the user is valid and for ending the session if two invalid PIN codes are received;
- (c) class and subject means, executed by the CPU of the attendance telephone, for displaying a list of classes, and for allowing a selection of a class from the list and for displaying a list of students and grades associated with the class selected;
- (d) grade entry means, executed by the CPU of the attendance telephone, for allowing grades to be entered in association with each of the students on the list of students associated with the class selected, whereby an updated list of students and grades is produced;
- (e) file transfer means, in communication with the CPU of the attendance telephone, for transferring the updated list of students and grades to the central office computer; and
- (f) end soft key means, in communication with the CPU of the attendance telephone, for ending the session.

12. An apparatus for taking school attendance, comprising:
- (A) a plurality of attendance telephone devices, each attendance telephone comprising:
  - (a) a central processing unit (CPU) in communications with an I/O device interface;
  - (b) keypad means, in communication with the I/O device interface, for communicating data to the central processing unit, comprising:
    - (i) a 12-key pad; and
    - (ii) a plurality of soft keys;
  - (c) attendance register means, in communication with the central processing unit, for storing data associated with student's names,
  - (d) a telephone receiver, in communication with the I/O device interface;
  - (e) a period timer display, in communication with the I/O device interface;
  - (f) voice processing means, in communication with a software control program executed by the central processing unit, for digitizing sound for storage and transmission; and
  - (g) visual display means, in communication with the I/O device interface, for displaying textual information;
- (B) a central office computer, comprising:
  - (a) a central processing unit (CPU);
  - (b) an I/O interface, in communication with control software executed by the CPU;
  - (c) records database means, carried by a memory storage device in communication with the central processing unit, for storage of student information;
  - (d) time table database means, carried by a memory storage device in communication with the central processing unit, for storage of school scheduling information;
  - (e) voice processing means, in communication with control software executed by the central processing unit, for digitizing voice and sound for storage and retrieval; and (f) digital voice and data register means, in communication with the central processing unit, for storing voice and sound information; and (C) data transfer means, connecting the central office computer to each of the plurality of attendance telephone devices, for the two-way transmission of data between the central office computer and the plurality of attendance telephone devices;

(D) attendance software, resident within attendance telephone and on the central office computer, to support a session allowing a teacher to take and record attendance and to allow interaction between the attendance telephone and the central office computer, comprising:
  (a) attendance soft key means, in communication with the CPU of the central office computer, for triggering the software to prompt a user to enter a PIN code;
  (b) validity check means for verifying the PIN code and for ending the session if two invalid PIN codes are received;
  (c) data reception and display means, executed by the CPU of the attendance telephone and the CPU of the central office computer, for receiving a menu from of central office computer and displaying it on the visual display means of the attendance telephone;
  (d) selection means, in communication with the CPU of the attendance telephone, for allowing the user to select a menu entry from among the choices of the menu, and for resulting in the display of a list of students in a class;
  (e) status indicator means, in communication with the CPU of the attendance telephone, for allowing the user to add to the list an attendance status for each student;
  (f) send soft key means, in communication with the CPU of the attendance telephone, for allowing the user to transmit the list of students, together with each student's attendance status, to the central office computer; and
  (g) end soft key means, in communication with the CPU of the attendance telephone, for allowing the user to end the session;

(E) excused absence software, resident within central office computer, to support a session allowing a parent to report an excused absence, comprising:
  (a) modem means, in communication with the I/O interface of the central office computer, for answering a telephone call from the parent;
  (b) first validity check means for verifying a PIN code transmitted by the parent is valid and for ending the session if two invalid PIN codes are received;
  (c) second validity check means for verifying a student ID code transmitted by the parent is valid and for ending the session if two invalid student ID codes are received;
  (d) menu presentation means for presenting the parent with several selection options and allowing the parent to select an excused absence function;
  (e) recording and storage means for recording and storing the parent's verbal excuse for the student's absence;
  (f) status change means for associating the student and student ID code with an excused absence;
  (g) update means for transmitting the excused absence information to the appropriate attendance telephone; and
  (h) excused data soft key means, carried by the AT device, for playing back excused absence information;

(F) voice memorandum software, resident within attendance telephone, to support a session resulting in the recording of a voice memorandum, comprising:
  (a) voice memo soft key means, in communication with the CPU of the attendance telephone, for starting the session;
  (b) validity check means for verifying a PIN code transmitted by the user is valid and for ending the session if two invalid PIN codes are received;
  (c) destination control means for allowing the user to input the address of at least one attendance telephone or the central office computer;
  (d) recording means for digitizing and storing the user's verbal message; and
  (e) file transfer means for transferring the digitized and stored verbal message to the at least one attendance telephone or the central office computer;

(G) playback software, resident within an attendance telephone, to support a session resulting in playback of a recorded voice memorandum, comprising:
  (a) playback soft key means, in communication with the CPU of the central attendance telephone, for starting the session;
  (b) validity check means for verifying a PIN code transmitted by the user is valid and for ending the session if two invalid PIN codes are received; and
  (c) play means for playing the recorded voice memorandum;

(H) announcement software, resident within central office computer, to support a session resulting in a digitized announcement being transferred from the central office computer to at least one attendance telephone, comprising:
  (a) announcement soft key means, in communication with the CPU of the central office computer, for starting the session;
  (b) validity check means for verifying a PIN code transmitted by the user is valid and for ending the session if two invalid PIN codes are received;
  (c) recording and storage means, in communication with the CPU of the central office computer, for recording and storing the digitized announcement;
  (d) file transfer means for transferring the digitized announcement to at least one attendance telephone;
  (e) code sequence means, carried by the digitized announcement, for indicating an emergency announcement;
  (f) file storage means, carried by the at least one attendance telephone, for storing the digitized announcement;
  (g) indicator means, carried by the attendance telephone, for indicating that a digitized announcement has been received; and
  (h) code sequence decoding means, executed by the CPU of the attendance telephone, for determining if the digitized announcement is an emergency announcement, and for playing the digitized announcement immediately if it is an emergency announcement;

(I) database access software, resident within attendance telephone, to support a session enabling a teacher using an attendance telephone to access a database resident on the central office computer, comprising:
  (a) records soft key means, in communication with the CPU of the attendance telephone, for starting the session;

(b) validity check means for verifying a PIN code transmitted by the user is valid and for ending the session if two invalid PIN codes are received;
(c) display search menu means, transmitted by the central office computer to the attendance telephone, for providing a list of search parameters;
(d) file transfer means, executed by the CPU of the central office computer and the CPU of the attendance telephone, for transferring to the attendance telephone a desired file;
(e) update means, executed by the CPU of the attendance telephone, for allowing changes to be made to the desired file, thereby producing an updated file;
(f) send soft key means, in communication with the CPU of the attendance telephone, for transferring to the central office computer the updated file; and
(g) end soft key means, in communication with the CPU of the attendance telephone, for terminating the session; and (J) grade entry software, resident within attendance telephone, to support a session allowing a teacher to enter a grade associated with a student's record into a file on the central office computer, comprising:

(a) grade entry soft key means, in communication with the CPU of the attendance telephone, for starting the session;
(b) validity check means for verifying if a PIN code transmitted by the user is valid and for ending the session if two invalid PIN codes are received;
(c) class and subject means, executed by the CPU of the attendance telephone, for displaying a list of classes, and for allowing a selection of a class from the list and for displaying a list of students and grades associated with the class selected;
(d) grade entry means, executed by the CPU of the attendance telephone, for allowing grades to be entered in association with each of the students on the list of students associated with the class selected, whereby an updated list of students and grades is produced;
(e) file transfer means, in communication with the CPU of the attendance telephone, for transferring the updated list of students and grades to the central office computer; and
(f) end soft key means, in communication with the CPU of the attendance telephone, for ending the session.

* * * * *